United States Patent
Mullen et al.

(10) Patent No.: US 9,818,125 B2
(45) Date of Patent: Nov. 14, 2017

(54) SYSTEMS AND METHODS FOR INFORMATION EXCHANGE MECHANISMS FOR POWERED CARDS AND DEVICES

(75) Inventors: Jeffrey D. Mullen, Pittsburgh, PA (US); Philip W. Yen, Cupertino, CA (US)

(73) Assignee: DYNAMICS INC., Pittsburgh, PA (US)

( * ) Notice: Subject to any disclaimer, the term of this patent is extended or adjusted under 35 U.S.C. 154(b) by 281 days.

(21) Appl. No.: 13/158,461

(22) Filed: Jun. 13, 2011

(65) Prior Publication Data

US 2012/0209744 A1    Aug. 16, 2012

Related U.S. Application Data

(60) Provisional application No. 61/443,662, filed on Feb. 16, 2011.

(51) Int. Cl.
*G06Q 30/00* (2012.01)
*G06F 17/30* (2006.01)
*G06Q 30/02* (2012.01)
*G06Q 30/06* (2012.01)

(52) U.S. Cl.
CPC ......... *G06Q 30/02* (2013.01); *G06Q 30/0641* (2013.01)

(58) Field of Classification Search
CPC .......................... G06Q 30/02; G06Q 30/0641
USPC .................... 705/26.1–27.2, 26.41
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

Let Your Fingers Do the Shopping, Banking. (Jan. 7, 1993). The Sun Retrieved from https://search.proquest.com/docview/406773143?accountid=14753.*

(Continued)

*Primary Examiner* — Kathleen Palavecino (57) ABSTRACT

A card, or other device (e.g., a mobile telephonic device), may provide transaction, feature information, and/or any other type of information to a merchant terminal based upon check-in options that may be selected by the user on the card. A routing server may receive transaction information, feature information, merchant related information, cardholder information and/or any other type of information and provide the information to networked entities. The networked entities (e.g., websites, social networks, and search engines) may access the information to track the purchasing habits of one or more cardholders.

16 Claims, 8 Drawing Sheets

(56) References Cited

U.S. PATENT DOCUMENTS

| | | |
|---|---|---|
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,929,550 B2 | 8/2005 | Hisada |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparinl et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0133787 A1 | 7/2004 | Doughty |
| 2004/0162732 A1 | 8/2004 | Rahim et al. |
| 2004/0172535 A1 | 9/2004 | Jakobsson |

(56) References Cited

U.S. PATENT DOCUMENTS

| | | |
|---|---|---|
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0140536 A1 | 6/2008 | Ruiz Tejedor et al. |
| 2008/0148394 A1 | 6/2008 | Poidomani et al. |
| 2008/0156865 A1* | 7/2008 | Leifer .................. 235/379 |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0048971 A1 | 2/2009 | Hathaway et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159700 A1 | 6/2009 | Mullen |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2010/0016070 A1 | 1/2010 | Walker et al. |
| 2010/0029380 A1 | 2/2010 | Rhoads et al. |
| 2010/0093421 A1 | 4/2010 | Nyman et al. |
| 2010/0250356 A1* | 9/2010 | Gillenson et al. ......... 705/14.18 |
| 2010/0250687 A1* | 9/2010 | Smith et al. .................. 709/206 |
| 2010/0306099 A1* | 12/2010 | Hirson et al. .................. 705/38 |
| 2011/0022472 A1* | 1/2011 | Zon ............................ 705/14.64 |
| 2011/0028184 A1 | 2/2011 | Cooper |
| 2011/0106698 A1* | 5/2011 | Isaacson et al. ................. 705/41 |
| 2011/0112866 A1* | 5/2011 | Gerrans .............................. 705/3 |
| 2011/0196926 A1* | 8/2011 | Crawford ...................... 709/204 |
| 2011/0215138 A1* | 9/2011 | Crum ............................ 235/375 |
| 2011/0238517 A1* | 9/2011 | Ramalingam et al. ...... 705/26.1 |
| 2011/0289433 A1* | 11/2011 | Whalin et al. ................. 715/753 |
| 2013/0144701 A1* | 6/2013 | Kulasooriya et al. ..... 705/14.24 |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/594,300, Poidomani et al.
U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.
U.S. International Search Report, dated Mar. 12, 2012.

* cited by examiner

CHECK-IN UPDATE

402 — JEFF MULLEN PURCHASES THIS MONTH – 25
JEFF MULLEN COFFEE PURCHASES THIS MONTH – 6
JEFF MULLEN STARBUCKS PURCHASES THIS MONTH - 2

404 — - JEFF MULLEN JUST BOUGHT SOMETHING AT STARBUCKS

CHECK-IN UPDATE

502 — JEFF MULLEN JUST BOUGHT GAS AT A BP GAS STATION

CHECK-IN POINTS

602 — SOCIAL NETWORK GAMING POINTS ACCUMULATED TOTAL – 567

604 — PARTICIPANT A TOTAL – 400 (70.5% OF TOTAL)
PARTICIPANT B TOTAL – 125 (22% OF TOTAL)
PARTICIPANT C TOTAL – 42 (7.5% OF TOTAL)

SYSTEMS AND METHODS FOR INFORMATION EXCHANGE MECHANISMS FOR POWERED CARDS AND DEVICES

CROSS-REFERENCE TO RELATED APPLICATION

This application claims the benefit of U.S. Provisional Patent Application No. 61/443,662, titled "SYSTEMS AND METHODS FOR INFORMATION EXCHANGE MECHANISMS FOR POWERED CARDS AND DEVICES," filed Feb. 16, 2011, which is hereby incorporated by reference herein in its entirety.

BACKGROUND OF THE INVENTION

This invention relates to magnetic cards and devices and related systems.

SUMMARY OF THE INVENTION

A card may include a dynamic magnetic communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read-head of a magnetic stripe reader. A magnetic emulator, for example, may communicate data serially to a read-head of the magnetic stripe reader. A magnetic emulator, for example, may communicate data in parallel to a read-head of the magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A dynamic magnetic stripe communications device may be implemented on a multiple layer board (e.g., a two-layer flexible printed circuit board). A coil for each track of information that is to be communicated by the dynamic magnetic stripe communications device may then be provided by including wire segments on each layer and interconnecting the wire segments through layer interconnections to create a coil. For example, a dynamic magnetic stripe communications device may include two coils such that two tracks of information may be communicated to two different read-heads included in a read-head housing of a magnetic stripe reader. A dynamic magnetic stripe communications device may include, for example, three coils such that three tracks of information may be communicated to three different read-heads included in a read-head housing of a magnetic stripe reader.

Input and/or output devices may be included on a card, for example, to facilitate data exchange with the card. For example, an integrated circuit (IC) may be included on a card and exposed from the surface of the card. Such a chip (e.g., an EMV chip) may communicate information to a chip reader (e.g., an EMV chip reader). An RFID antenna or module may be included on a card, for example, to send and/or receive information between an RFID writer/reader and the RFID included on the card.

One or more detectors may be provided, for example, to sense the presence of an external object, such as a person or device, which in turn, may trigger the initiation of a communication sequence with the external object. The sensed presence of the external object may then be communicated to a processor of a card, which in turn may direct the exchange of information between the processor and the external object. Accordingly, timing aspects of the information exchange between a card and the various I/O devices implemented on a card may be determined by a processor of a card.

The sensed presence of the external object or device may include the type of object or device that is detected and, therefore, may then determine the type of communication that is to be used with the detected object or device. For example, a detected object may include a determination that the object is a read-head housing of a magnetic stripe reader. Such an identifying detection, for example, may activate a dynamic magnetic stripe communications device so that information is communicated (e.g., electromagnetically communicated) to the read-head of the magnetic stripe reader.

A card may include one or more processors, one or more buttons, memory, and one or more displays. The processor may, for example, process information that may be associated with an information exchange option that may be selected on a card.

A check-in option may, for example, be selected on a card or other device (e.g., a mobile telephonic device) to communicate information to a merchant terminal indicative of a user's desire to check-in at that merchant location during, for example, a purchase transaction (e.g., via magnetic stripe data, RFID data, or other financial transaction data). A user's desire to check-in at a merchant location may be provided to a remote server. A remote server may utilize received check-in data to provide a third party service such as, for example, an online social game or online social information site. Accordingly, the third party service may utilize a user's desire to check-in at a particular merchant location as part of an online game or information service. In this manner, a user may check-in at a location without having to do anything other than purchase an item at that location.

A consumer utilizing a check-in feature may be identified by a remote server in a variety of ways. For example, a user may press a check-in button on a payment card and information indicative of a user's desire to check-in at the merchant location may be communicated with a payment message from the card to a card reader. This payment message may include, for example, a payment card account number and associated discretionary data. A remote server, such as a remote server from a card issuer, may utilize the payment account number to identify the user, authorize the purchase transaction, and route information of a user's desire to check-in to a check-in service.

The identity of the consumer may also be communicated to the check-in service. For example, the account number may be communicated or, for example, the card issuer may utilize the account number to retrieve other identification information and send this other identification information to the check-in service. The check-in service may then, for example, utilize the consumers identity and check-in information. For example, a social information site may have a profile of that consumer and may list the various locations and times that the users have checked into a merchant location. The card issuer may also determine the merchant location or provide information received about the merchant to the check-in service provider. In doing so, the check-in service provider may determine the merchant location. Alternatively, for example, the card or other device may include additional consumer identification information and this information may be provided to a card reader during a transaction (e.g., the information may be included in discretionary magnetic stripe data).

A merchant location may be, for example, a general type of store (e.g., gas station), a name of a merchant (e.g., Walmart), the specific name of a store and general location of the store (e.g., Walmart, PA), or the location of a store (e.g., Walmart, Robinson Town Center, Pittsburgh, Pa.). Multiple check-in options may be provided on a card, or other device. For example, a card or other device may include the option to check-in at the merchant or check-in at the merchant and complete a purchase transaction. Accordingly, a remote server may indicate that a particular consumer is at a particular merchant location if the check-in is for the merchant. The remote server may also indicate that the particular consumer made a purchase and the total amount of the purchase (e.g., $98.50) if the check-in is for the merchant and the purchase.

A merchant terminal may, for example, collect information from a card (e.g., cardholder information) and may combine merchant information with the information received from the card. The combined information may, for example, be provided to a routing server. The routing server may, for example, provide the combined information to a network. Network entities on the network may, for example, receive, accumulate, and manipulate the combined information in support of consumer tracking activities that may be conducted by the network entities.

A card may, for example, provide one or more check-in options that may allow a cardholder to select a level of information exchange that may be desired by the cardholder. For example, a user may not activate a check-in option at all if that user does not wish to share cardholder information with a merchant terminal during, for example, a point-of-sale transaction. Cardholder information may be, for example, stored on a remote server and utilized if a cardholder desires that information to be utilized as a result of a purchase transaction according to any preferences that cardholder desires at the time of the purchase transaction.

A user may, for example, activate a check-in option that allows a user to provide cardholder information to a merchant terminal without conducting a point-of-sale transaction. A user may, for example, activate a check-in option that allows a user to provide cardholder information to a merchant terminal in addition to financial information that may be required in support of a point-of-sale transaction.

A user may, for example, activate a check-in option that allows a cardholder to provide cardholder emotion during a point-of-sale transaction. For example, a user may activate a "like" emotion during a point-of-sale transaction that allows the user to express that he or she particularly likes a purchase. A user may, for example, activate a check-in option that allows a cardholder to share information with an expanded audience (e.g., a user may direct cardholder information to a predetermined audience).

Information may, for example, be collected from one or more cardholders that exercise a check-in option. For example, an entity (e.g., a website) may collect information associated with one or more cardholders that may be provided during point-of-sale transactions that include the communication of cardholder information during the transaction. Accordingly, for example, a website may track purchasing statistics of one or more cardholders and make those statistics available to interested parties (e.g., merchants and other commercial entities).

Gaming activities may be supported. For example, members of a social network may participate in gaming activities, whereby points may be awarded based upon the check-in activity of each participant. A certain number of points may, for example, be awarded to a participant each time that participant selects a check-in option at the point of sale. An increased number of points, for example, may be awarded to a participant that increases an amount of information shared during a point-of-sale transaction (e.g., whether or not the participant particularly liked the purchase). A participant may, for example, select an option to redeem points awarded during gaming activities at the point-of-sale terminal.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
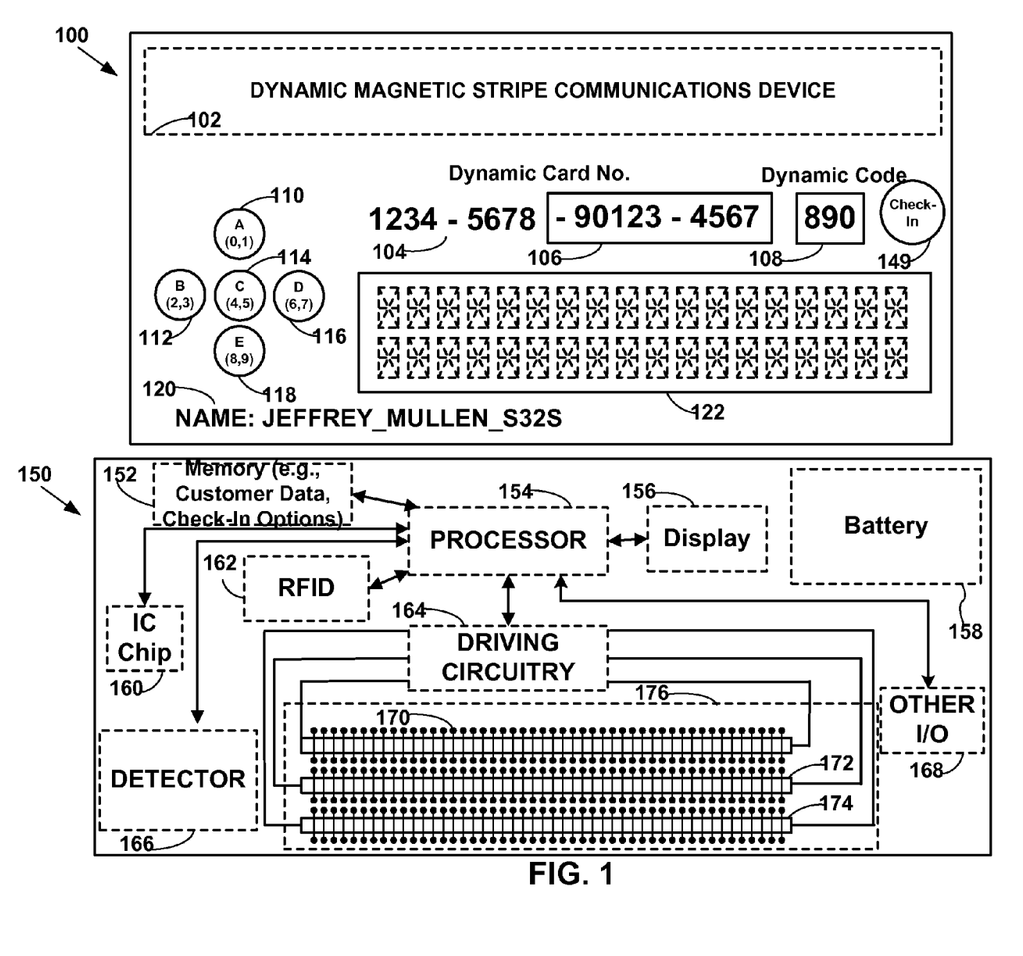
FIG. 1 is an illustration of a card constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information. For example, display 122 may be utilized to display information that is indicative of data (e.g., customer data and/or check-in data such as check-in options) that may be stored within a memory of card 100).

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by a processor of card 100 as data input.

For example, one or more buttons 110-118 may be activated to display indicia on a display (e.g., display 122) that may be associated with corresponding information (e.g., customer data and/or check-in options) that may be stored within a memory of card 100. Alternately, for example, a single button (e.g., button 110) may be pressed multiple times to sequentially display data that may be associated with information (e.g., customer data and/or check-in options).

Button 149 may be an information exchange feature that may be associated with card 100. Button 149 may, for example, be actuated so that a processor of card 100 may communicate information (e.g., customer data) that may be stored within a memory of card 100. Button 149 may, for example, be actuated so that a processor of card 100 may communicate information that may be stored within a memory of card 100 in addition to financial information that may be communicated during a financial transaction.

Persons skilled in the art will appreciate that information stored on a card (or other device such as a mobile telephonic device) and communicated to a terminal for completing a purchase transaction may include, for example, customer profile data (e.g., purchase history, purchase preferences, and geographic information). Information communicated from a merchant terminal may include, for example, information communicated from a card (or other device such as a mobile telephonic device) and merchant information (e.g., merchant identifier, merchant category, merchandise identifier, merchandise descriptions, merchandise price, merchandise discounts, and promotions). Information communicated from a card (or other device) or merchant terminal may include financial institution information (e.g. bank promotions and bank identifier) as well as any other type of data.

Persons skilled in the art will appreciate that a physical payment card may be provided as a virtual payment card on a display of any device, such as a mobile telephonic device or personal computing device. A button on a physical payment card may be a button on any device, such as a mobile telephonic device or personal computing device.

Accordingly, for example, a device (e.g., a cell phone) may receive manual input from a manual user interface (e.g., a virtual button on a capacitive touch screen) and communicate information indicative of the selection (e.g., a selection of a check-in feature) to another device (e.g., a payment terminal such as a card reader) via a communications device (e.g., an RF-based communications device).

FIG. 1 shows architecture 150, which may include one or more processors 154. One or more processors 154 may be configured to utilize memory 152 external to processor 154, internal memory to processor 154, or a combination of external memory and internal memory for dynamically storing information, such as executable machine language, related dynamic machine data, user input data values, or any other type of information (e.g., information communicated from a card, other device, or merchant terminal). Check-in option data may be stored as data on memory 152, retrieved when associated buttons are pressed, and communicated to a merchant terminal (e.g., via dynamic magnetic stripe, exposed chip, or RF data) to complete a purchase transaction.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may be, for example, touch sensitive and/or proximity sensitive. For example, objects such as fingers, pointing devices, etc., may be brought into contact with displays 156, or into proximity with displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented on architecture 150. For example, integrated circuit (IC) chip 160 (e.g., an EMV chip) may be included within architecture 150, that may communicate information to a chip reader (e.g., an EMV chip reader). Radio frequency identification (RFID) module 162 may be included within architecture 150 to enable the exchange of information between an RFID reader/writer and a card (e.g., card 100 of FIG. 1).

Other input and/or output devices 168 may be included within architecture 150, for example, to provide any number of input and/or output capabilities on a card (e.g., card 100 of FIG. 1). For example, other input and/or output devices 168 may include an audio device capable of receiving and/or transmitting audible information. Other input and/or output devices 168 may include a Wi-Fi device, such that a card (e.g., card 100 of FIG. 1) may access an open network (e.g., the Internet).

Other input and/or output devices 168 may include a device that exchanges analog and/or digital data using a visible data carrier. For example, light pulses may be received by other input and/or output devices 168 and may be construed as data indicative of information that may be stored within memory 152. Other input and/or output devices 168 may include a device, for example, that is sensitive to a non-visible data carrier, such as an infrared data carrier or electromagnetic data carrier. Other input and/or output devices 168 may include a device, for example, that simulates a touch or proximity of a pointing device (e.g., a human finger or stylus). Such a simulation may, for example, be detected by a touch sensitive display as information (e.g., information stored in internal memory 152).

Persons skilled in the art will appreciate that a card (e.g. card 100 of FIG. 1) may, for example, be a self-contained device that derives its own operational power from one or more batteries 158. Furthermore, one or more batteries 158 may be included, for example, to provide operational power to a card for a period of time (e.g., approximately a period between 2 and 5 years such as approximately 2 years). One or more batteries 158 may be included, for example, as rechargeable batteries.

A dynamic magnetic stripe communications device may be included on a card (e.g., card 100 of FIG. 1) to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between a card and the various input and/or output devices implemented on the card may be determined by a processor of the card. Detector 166 may be utilized, for example, to sense the proximity and/or actual contact, of an external device, which in turn, may trigger the initiation of a communication sequence. The sensed presence and/or touch of the external device may then be communicated to a controller (e.g., processor 154), which in turn may direct the exchange of information between a card (e.g., card 100 of FIG. 1) and the external device. The sensed presence and/or touch of the external device may be effective to, for example, determine the type of device or object detected.

For example, the detection may include the detection of, for example, a read-head of a magnetic stripe reader. In response, processor 154 may activate one or more electromagnetic field generators 170-174 to initiate a communications sequence with, for example, one or more read-heads of a magnetic stripe reader. The timing relationships associated with communications to one or more electromagnetic field generators 170-174 and one or more read-heads of a magnetic stripe reader may be provided through use of the detection of the magnetic stripe reader.

Persons skilled in the art will appreciate that processor 154 may provide user-specific and/or card-specific information through utilization of any one or more buttons (e.g., buttons 110-118 of card 100 of FIG. 1), RFID 162, IC chip 160, electromagnetic field generators 170-174, and other input and/or output devices 168.

Figure 2:
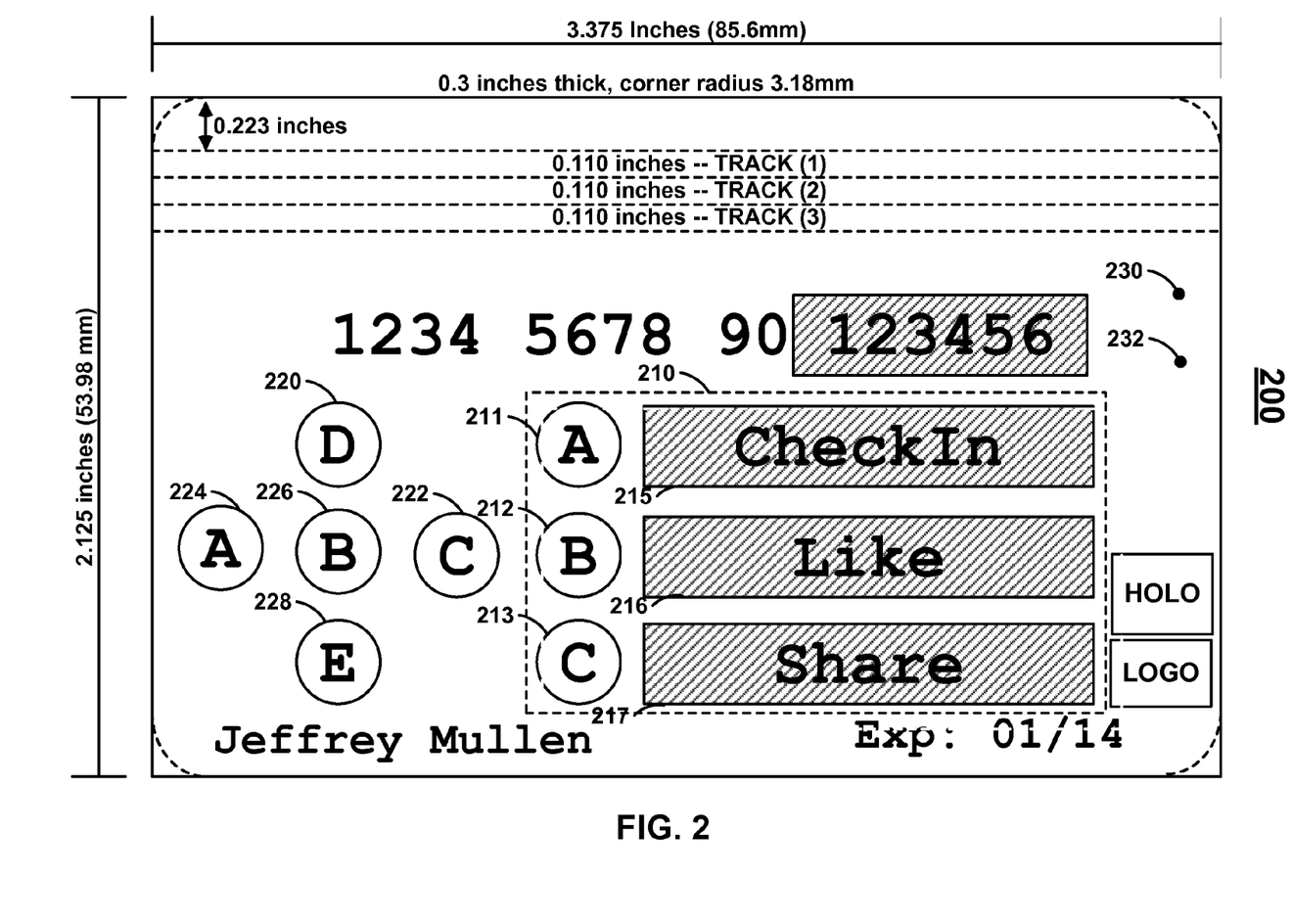
FIG. 2 is an illustration of a card constructed in accordance with the principles of the present invention.

FIG. 2 shows card 200 that may include, for example, configuration 210. Configuration 210 may include, for example, button 211, button 212, button 213, display 215, display 216, and display 217. Button 211 may be associated with display 215. Button 211 may be pressed to utilize the option described by display 215. Button 212 may be associated with display 216. Button 212 may be pressed to utilize the option described by display 216. Button 213 may be associated with display 217. Button 213 may be pressed to utilize the option described by display 217. A card may include additional buttons or displays or may not include the number of buttons or displays of card 200. For example, a card may include only a single button (e.g., button 211) and only a single associated display (e.g., display 215).

Card 200 may download, store, and communicate information. Information may, for example, be downloaded into card 200 via light sensor 230. Light sensor 230 may, for example, be sensitive to pulses of light and/or time varying light intensity and may be detected by a processor of card 200 as data. Light source 232 may, for example, generate pulses of light and/or time varying light intensity as directed by a processor of card 200 as data.

Information utilized or communicated by a card, other device, or merchant terminal may include, for example, customer profile data, merchant information, and issuer information. Information utilized or communicated by a card, other device, or merchant terminal may include, for example, information associated with social networks, internet search providers, corporations, charities, or any other entity.

Activation of one or more buttons on card 200 may cause a processor of card 200 to exchange information. Activation of one or more buttons on card 200 may, for example, cause a processor of card 200 to exchange information via light sensor 230 and/or light source 232. Activation of one or more buttons on card 200 may, for example, cause a processor of card 200 to communicate information to a magnetic stripe reader during, for example, a financial transaction. Activation of one or more buttons on card 200 may, for example, cause a processor of card 200 to communicate information to a magnetic stripe reader without the need to conduct a financial transaction.

Information utilized or communicated by a processor of card 200 may be downloaded into card 200 via manual input provided to card 200 via one or more buttons 220-228. Information utilized or communicated by a processor of card 200 may be communicated to card 200 via a card-to-card transfer from another card. A light source of another card may, for example, generate light pulses that may be detected by light sensor 230 and construed by a processor of card 200 as data.

Information utilized or communicated by a processor of card 200 may be communicated to card 200 via a monitor or display that is capable of providing flashing light. Accordingly, for example, any location (e.g., a website, an ATM, a bank branch, a card personalization machine, kiosk, or merchant terminal) that provides such a monitor or display may communicate to card 200.

Actuation of button 211 may activate an option indicated by display 215. A check-in feature, for example, may be activated by pressing button 211. Once a check-in feature is activated, a user of card 200 may communicate transaction, feature information, and/or any other type of information from card 200 to, for example, a merchant terminal.

A check-in feature may be stand alone. For example, a user may arrive at a particular place of business and present card 200 to a merchant terminal (e.g., a magnetic stripe reader) without transacting a purchase with the merchant. Accordingly, for example, a user may press button 211 and swipe card 200 at the merchant's terminal to register the user's presence at a particular place of business. In so doing, for example, a merchant terminal may receive customer information from card 200 that may be related to a user of card 200 and may distribute such customer information to multiple parties (e.g., the merchant, the card issuing financial institution, a website, or a social network).

A check-in feature may be associated with a financial transaction. For example, a user may select a check-in option on card 200 and present card 200 at a merchant's terminal to complete a point-of-sale purchase. Accordingly, for example, a user may press button 211 and swipe card 200 at a merchant's point-of-sale terminal and customer information relating to a user of card 200 may be communicated to the merchant's point-of-sale terminal, for example, within one or more data fields (e.g., one or more discretionary data fields). The merchant's point-of-sale terminal may, for example, combine merchant information (e.g., merchant location, merchant identification, and purchase transaction details) with customer information received from card 200. The merchant's point-of-sale terminal may, for example, forward the combined customer and merchant information to, for example, a routing server for further processing.

Actuation of button 212 may activate an option indicated by display 216. A like feature, for example, may be activated by pressing button 212. Once a like feature is activated, card 200 may communicate customer information and/or transactional information to a merchant terminal or any other terminal that may be enabled to communicate with card 200. Accordingly, for example, a user of card 200 may communicate a purchase emotion (e.g., a user likes a particular purchase) during a point-of-sale transaction. In so doing, a user may communicate a purchase emotion that may be associated with a particular merchant, product, or purchase.

Actuation of button 213 may activate an option indicated by display 217. A share feature, for example, may be activated by pressing button 213. A share feature may, for example, allow a user of card 200 to share transaction, feature information, and/or any other type of information to an extended audience. For example, a user of card 200 may elect to provide transaction, feature information, and/or any other type of information to a predetermined set of recipients after a share feature is activated and communicated to a merchant terminal.

Any one or all of the features displayed in displays 215, 216 and/or 217 may be associated with a special option. For example, a check-in special option may be activated upon the subsequent actuation of, for example, button 211 after a check-in feature is activated (e.g., a feature associated with display 215). Other buttons (e.g., buttons 220-228) may be used to activate the special option after the check-in feature is selected. In so doing, for example, a merchant may provide special offers in exchange for a cardholder's participation with a check-in feature.

For example, a cardholder may claim discounts or free merchandise that may be offered by a merchant in exchange for the cardholder's participation with a check-in feature. Such merchant offers may be downloaded into card 200 and displayed to a cardholder prior to the cardholder's participation.

In the event that a cardholder activates a check-in special option, card 200 may communicate an indication to a merchant's point-of-sale terminal that the cardholder wishes to redeem the merchant's special offer. Such a merchant's special offer, for example, may be applied by the merchant prior to payment processing. Such a merchant's special offer, for example, may be sent to the card issuer where the special may be settled or sent to other parties for reconciliation.

Special options may, for example, be similarly associated with utilizations of other check-in features (e.g., a like feature associated with display 216 and a share feature associated with display 217). Special options may, for example, only be activated upon a certain number of utilizations of a check-in feature (e.g., a feature associated with display 215), a like feature (e.g., a feature associated with display 216), and/or a share feature (e.g., a feature associated with display 217).

Figure 3:
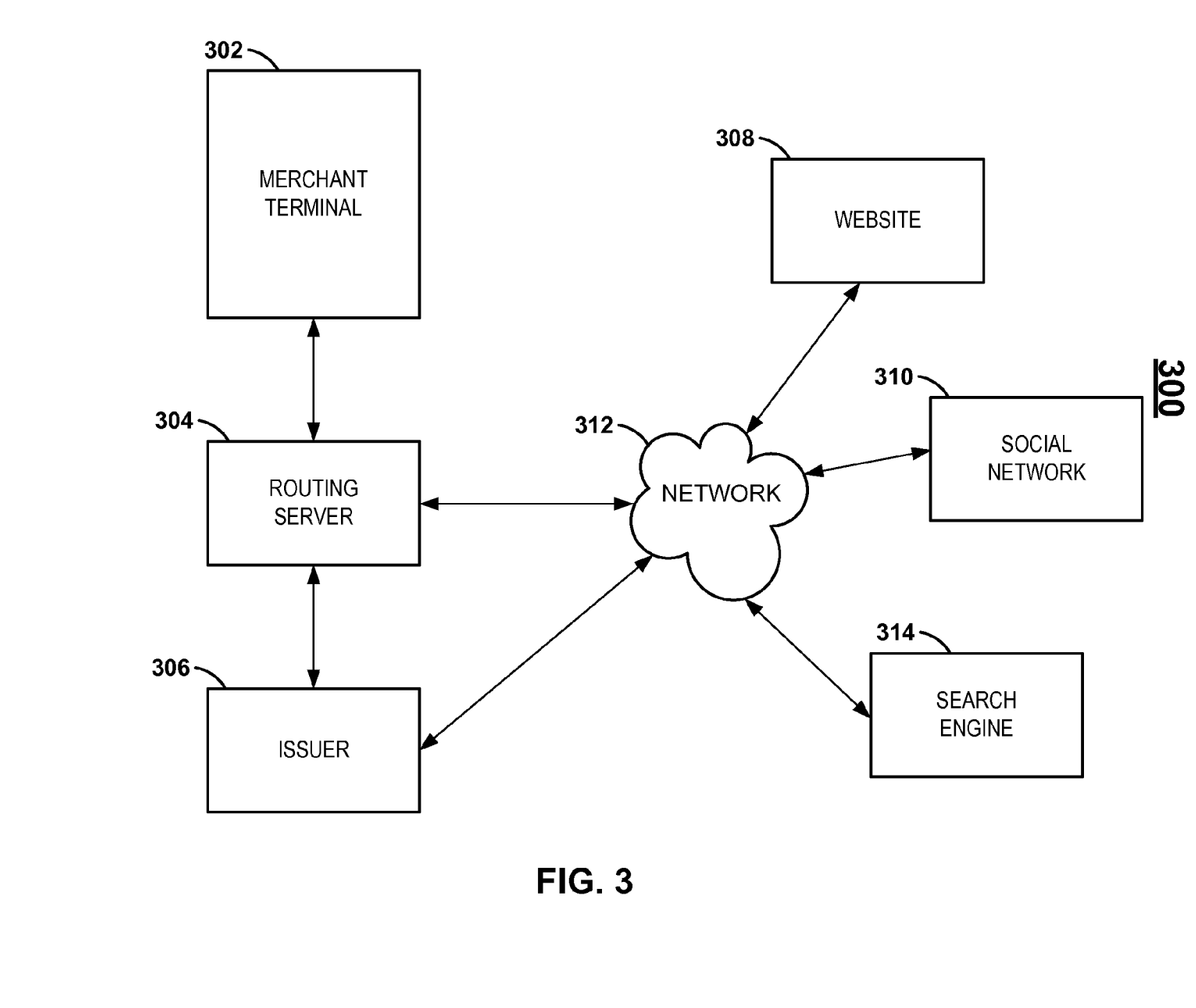
FIG. 3 is an illustration of a system constructed in accordance with the principles of the present invention.

FIG. 3 shows system 300. System 300 may, for example, include merchant terminal 302, routing server 304, issuer 306, network 312, website 308, social network 310, and search engine 314. Merchant terminal 302 may collect payment transaction data, feature information, and/or any other type of information from a card that may be presented to merchant terminal 302. Merchant terminal 302 may collect transaction, feature information, and/or any other type of information from a card, for example, during a check-in event. Merchant terminal 302 may collect transaction, feature information, and/or any other type of information from a card during a point-of-sale transaction that may be accompanied by a check-in event.

Merchant terminal 302 may, for example, forward the transaction, feature information, and/or any other type of information collected from a card to routing server 304. Merchant terminal 302 may, for example, combine merchant data (e.g., merchant identification, merchant location, and merchant category) with transaction, feature information, and/or any other type of information collected from a card. Merchant terminal 302 may, for example, forward the combined information to routing server 304. Routing server 304 may, for example, parse the forwarded information received from merchant terminal 302 and forward the parsed information to issuer 306.

Upon receipt of the parsed information, issuer 306 may share all, or part, of the received information with other network entities accessible via network 312. For example, issuer 306 may exercise an agreement with an application provider on network 312, such that all, or part, of the combined information may be shared with the application provider in the event that the cardholder has exercised a check-in feature. In so doing, the cardholder may, for example, be entitled to benefits (e.g., rewards points or incentives) from the application provider in exchange for the shared information.

Routing server 304 may forward information to network 312 for disbursement to one or more entities that may be interconnected via network 312 (e.g., the internet). The forwarded information may, for example, contain information associated with a check-in feature. For example, data that may be relevant to a cardholder's purchase activity (e.g., cardholder's location during a purchase, a purchased product description, and amount of purchase) may be reported to a network entity. The combined information may, for example, contain information associated with the cardholder (e.g., the cardholder's demographic information, the cardholder's purchase history in the merchant's category, and the cardholder's purchase history at the merchant's place of business). The combined information may, for example, contain information associated with the merchant (e.g., merchant's identification, merchant's location, and merchant's category).

Information provided by routing server 304 may, for example, be propagated to various network entities that may be connected to network 312. Website 308, for example, may collect the information and may generate associated updates. Social network 310 may, for example, interoperate with website 308, such that the generated updates may support social gaming activity that may be associated with the check-in activity of one or more cardholders. For example, social network 310 may sponsor a social gaming activity, whereby check-in updates collected by website 308 may be used to reward a cardholder that may have achieved a threshold level of check-in activity.

Search engine 314 may, for example, collect information that may be provided by routing server 304. Accordingly, for example, search engine 314 may allow merchants and other entities to gather information and/or data about existing and potential customers, so that optimized incentives may be offered that may lure new customers and/or retain current customers. Search engine 314 may, for example, allow consumers to obtain relevant promotions from merchants that may, for example, be offering incentives and promotions to lure new customers.

Figure 4:
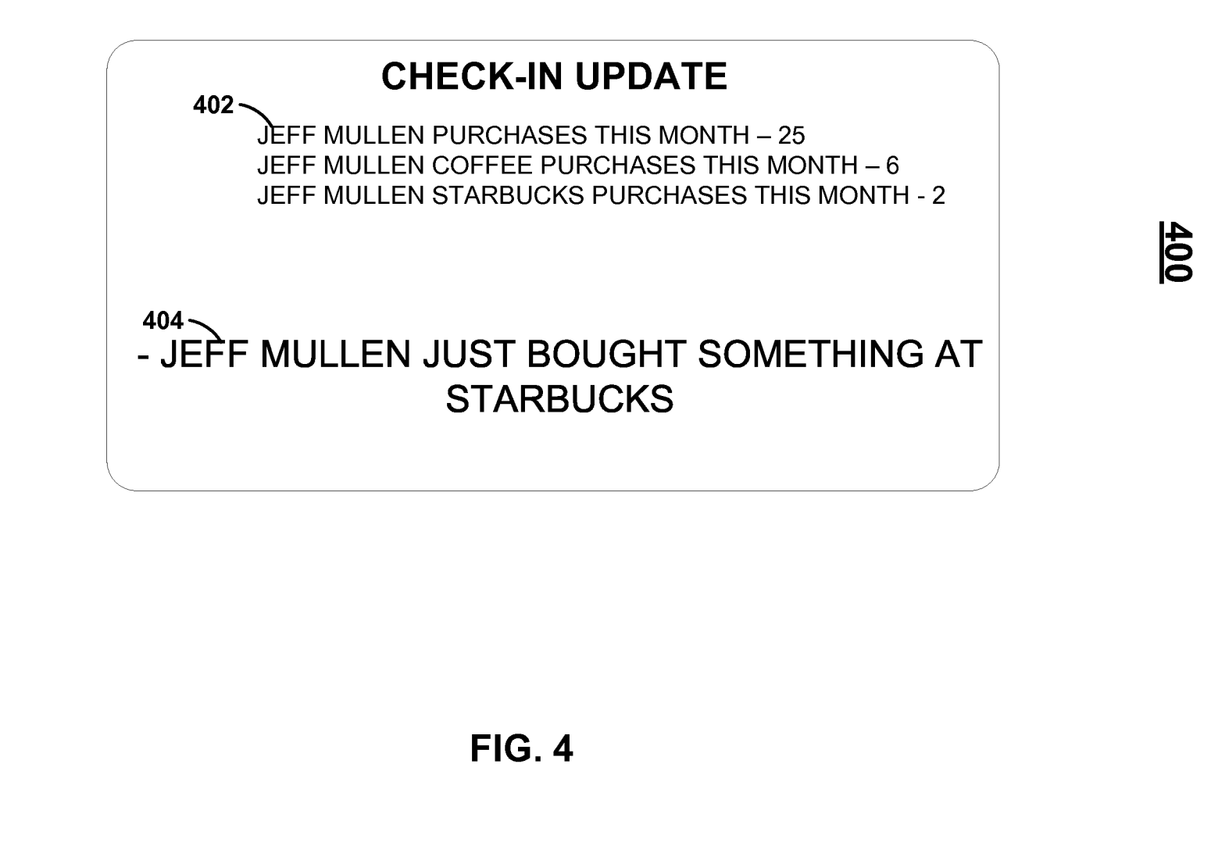
FIG. 4 is an illustration of a website constructed in accordance with the principles of the present invention.

FIG. 4 shows webpage 400. Webpage 400 may, for example, provide customized summary 402 of check-in data updates for a particular check-in user, as may be generated by a network entity collecting information as may be provided by one or more routing servers and/or one or more associated merchant terminals. Summary 402 may, for example, provide a summary of a number of purchases in any category for a given time period (e.g., total purchases in a one-month time period). Summary 402 may, for example, provide check-in summary data that may be associated with a particular merchant category (e.g., coffee merchants). Summary 402 may, for example, provide check-in summary data that may be associated with a particular merchant in a particular merchant category (e.g., Starbucks).

Webpage 400 may, for example, provide instantaneous update 404 that may provide substantially instantaneous check-in activity for a particular check-in participant (e.g., that a purchase just occurred for a particular check-in participant at a particular merchant's place of business).

Figure 5:
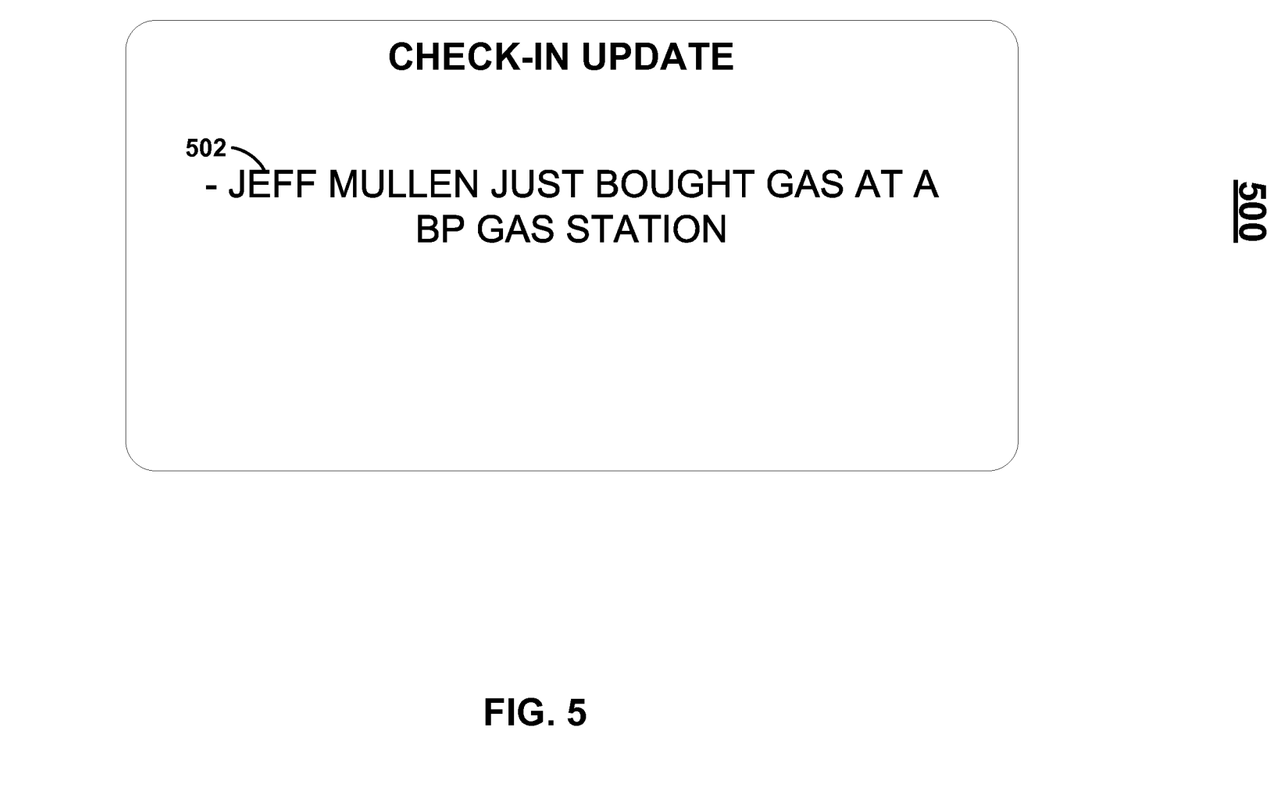
FIG. 5 is an illustration of a website constructed in accordance with the principles of the present invention.

FIG. 5 shows webpage 500. Webpage 500 may, for example, provide substantially instantaneous check-in update information 502 concerning a particular check-in participant. Update information 502 may, for example, provide information concerning a purchase of a product from a particular category of products. Update information 502 may, for example, provide information concerning a purchase of a particular product type from a particular product merchant.

Figure 6:
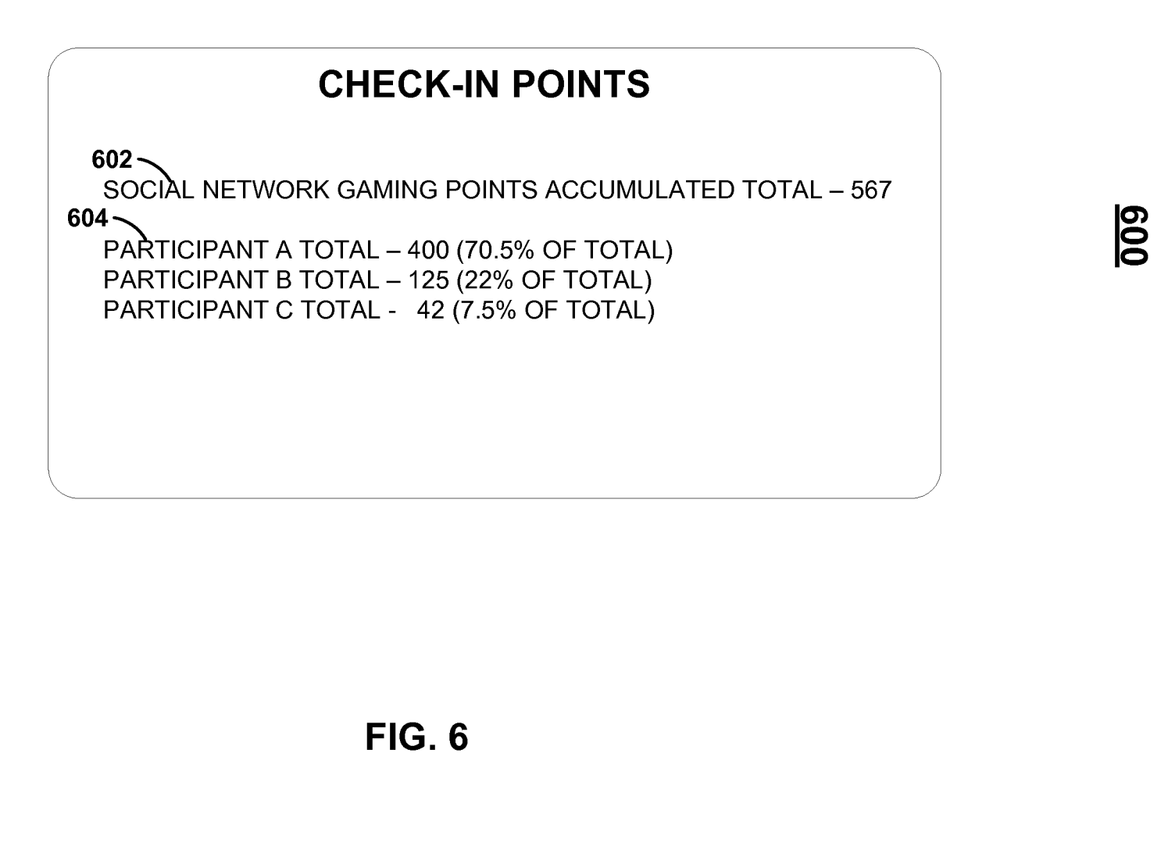
FIG. 6 is an illustration of a website constructed in accordance with the principles of the present invention.

FIG. 6 shows webpage 600. Webpage 600 may, for example, provide check-in activity updates that may be associated with the gaming activities of members of a social network. Check-in points may, for example, be accumulated for one or more participants in a social network game. Check-in points may, for example, be accumulated for any number of check-in activities that may be conducted by the participants of such a social network gaming activity.

For example, participants may accumulate points by utilizing a card, or a mobile telephonic device, by activating a check-in feature during financial transactions. Participants may accumulate points by activating any number of information exchange features (e.g., a check-in feature, a like feature, and a share feature) that may or may not be associated with a financial transaction.

A check-in feature with no special options may, for example, award a minimum number of points to a participant when activated during a financial transaction. A check-in feature with a single special option selected (e.g., a like feature) may, for example, award an increased number of points to a participant when activated during a financial transaction. A check-in feature with more than one special option selected (e.g., a like feature and a share feature) may, for example, award an increased number of points to a participant when activated during a financial transaction.

Accumulated point totals 604 for each participant of a social network game may, for example, be updated and downloaded into that participant's card or mobile telephonic device. In so doing, for example, a participant may monitor a number of points accumulated and may adjust his or her check-in activity accordingly. For example, a participant may increase his or her check-in activity and associated special option selections if that participant believed such activity would increase his or her accumulated point total.

An accumulated point total may, for example, be redeemed at a point-of-sale terminal. Accordingly, for example, a user may monitor his or her accumulated point total directly on his or her card or mobile telephonic device to determine if the accumulated point total has achieved a desirable value. If so, for example, a user may redeem the accumulated point total at a merchant's point-of-sale terminal for discounts or other benefits.

Figure 7:
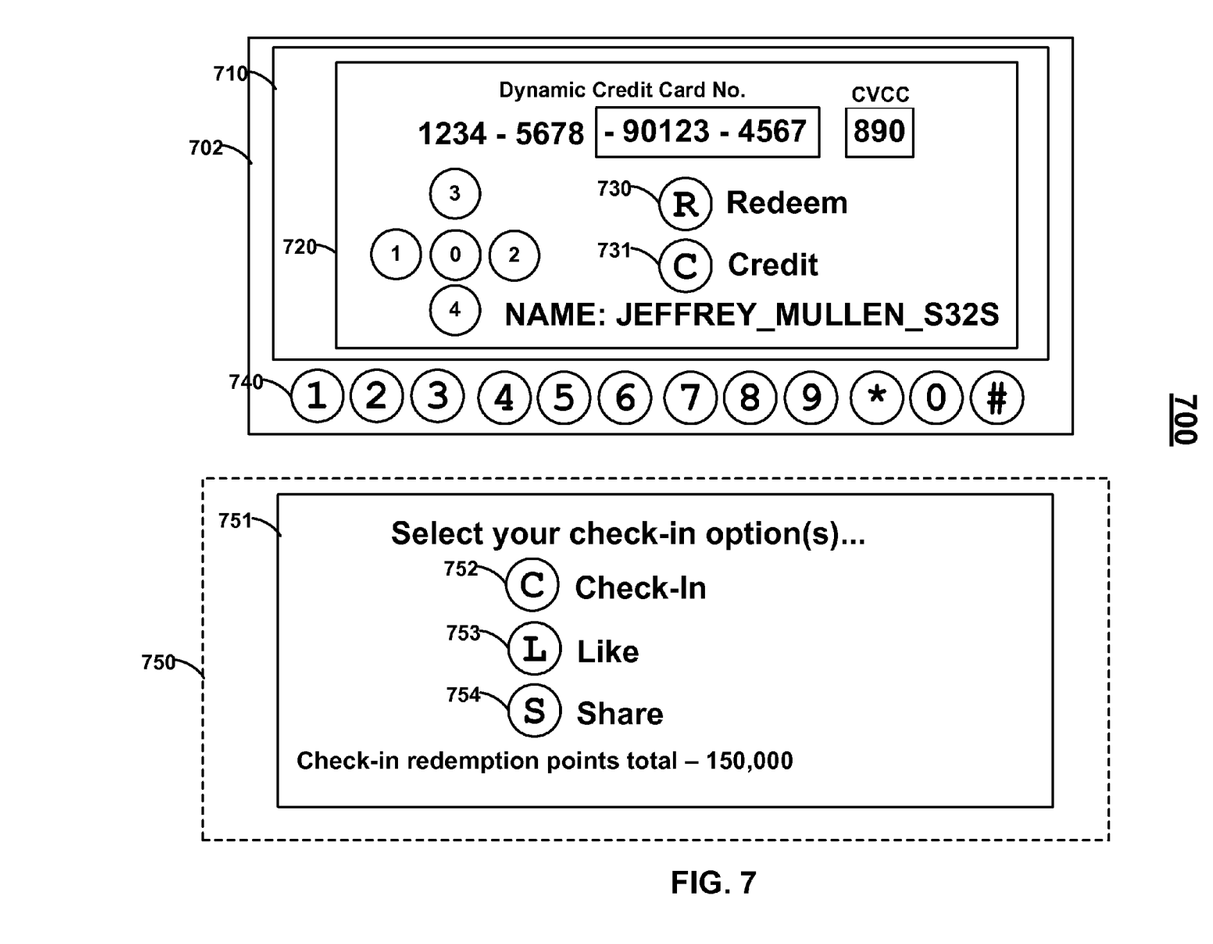
FIG. 7 is an illustration of a mobile device constructed in accordance with the principles of the present invention.

FIG. 7 shows device 700 that may be, for example, a mobile telephonic device such as a mobile cellular phone. Any card provided herein may be provided as a virtual card on device 700. Mechanical buttons 740 may be utilized by a user to make selections (e.g., selections associated with a virtual card). Virtual buttons may be included that a user can activate (e.g., by utilizing a touch-screen displaying a virtual card) so that the user can make selections associated with the virtual card. Device 700 may include, for example, housing 702, display 710, virtual card 720, and virtual buttons 730 and 731. Device 700 may communicate to a card reader via electromagnetic signals (e.g., RF signals). Virtual button 730 may, for example, be associated with a redemption of points awarded for check-in activity. Button 731 may, for example, be associated with selecting a particular payment card account (e.g., credit account).

Display configuration 750 may be provided and may be displayed, for example, on a wireless device such as a wireless telephonic device or a wireless payment card. Configuration 750 may include graphical user interface 751 that may include, for example, virtual button 752, virtual button 753, and virtual button 754. A user may be provided with the option of selecting a check-in feature, a like feature and/or a share feature. A user may perform a selection by pressing the virtual button associated with the selection. Information associated with the selection may be provided, for example, to a remote server (e.g., via a telephonic data communication) and/or a card (e.g., via light and/or sound pulses). A user may select one or more buttons on a physical card that are labeled as, for example, a "check-in" button, a "like" button, and/or a "share" button. Information indicative of that selection may then be communicated from the card to a card reader (e.g., via magnetic stripe data or RFID data) and then provided to a routing server. The routing server may then determine the level of information exchange that the user previously selected and initiate processing of the information exchanged.

Processing of an information exchange associated with a check-in feature may, for example, include a limited information exchange, where minimal information/data (e.g., cardholder identification and/or merchant identification) may be provided. A routing server may then parse the information and provide the information to various networked entities (e.g., entities networked via the internet).

A check-in feature and/or a like feature may be selected to denote a higher level of information/data sharing. For example, activation of a like feature may include an increased amount of information/data to be exchanged (e.g., cardholder identification, merchant identification, and/or transaction details). A check-in feature and/or a share feature may, for example, invoke even a higher level of information/data exchange (e.g., cardholder identification and/or merchant identification shared with an expanded audience).

Figure 8:
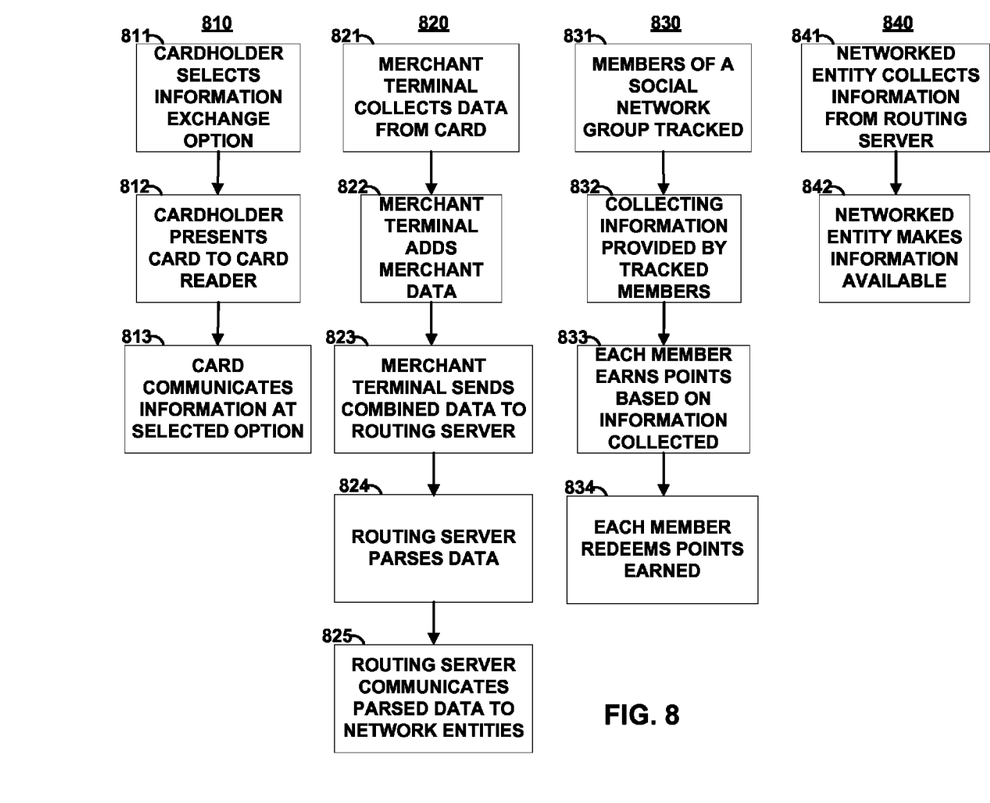
FIG. 8 is an illustration of a process flow chart constructed in accordance with the principles of the present invention.

A flow diagram of process sequences is shown in FIG. 8. Step 811 of sequence 810 may include, for example, selecting an information exchange option, where depending upon the option selected, varying levels of information/data sharing may be selected. Steps 812-813 may include presenting a card to a card reader and communicating the information exchange option and the associated information/data to the card reader.

Step 821 of sequence 820 may include, for example, a merchant terminal for collecting information/data provided by a card as well as an information exchange option selected by the card. Step 822 may include, for example, combining the information/data collected from a card with merchant information added by a merchant terminal or not combining merchant information with the information/data collected from the card. An amount of information combined by the merchant terminal may, for example, depend upon the information exchange option selected by the card. Step 823 may include, for example, sending the combined information/data from a merchant terminal to a routing server or simply forwarding the information/data collected from the card to a routing server. Step 824 may include, for example, parsing the information/data received by the routing server from the merchant terminal. Step 825 may include, for example, communicating the parsed information to network entities, such as search engines, websites, and social networks.

Step 831 of sequence 830 may include, for example, tracking check-in activities of members of a social network. Step 832 may include, for example, collecting information provided by the tracked members based upon information collection options that each member may have selected. Step 833 may include, for example, earning points based upon, for example, an amount and/or quality of information collected from each member. Step 834 may include, for example, each member's redemption of points earned based upon information collected from each member.

Step 841 of sequence 840 may include, for example, collection of information provided by a routing server. The information collected by the routing server may include, for example, customer profile data, customer purchase history, customer purchase preference, merchant identification, geographic location, merchant category, merchandise identification, merchandise description, merchandise price, merchandise discounts, merchant promotions, bank promotions, bank identification, and/or any other data. The collected information may, for example, be made available on a network (e.g., the internet) as in step 842. Accordingly, the collected information may be network accessible by, for example, websites, search engines, and social networks.

Persons skilled in the art will appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A method, comprising:
   receiving, by a payment device, a selection of a check-in option, wherein said payment device is a payment card having an interface and a plurality of buttons;
   communicating a payment account number and information associated with said selected check-in option to a merchant terminal as part of a purchase transaction;
   authorizing said purchase transaction; and
   updating a user profile, associated with said payment account number, that said user checked-in with a merchant associated with said merchant terminal.

2. The method of claim 1, wherein said communicating is provided by a communications device on said payment device.

3. The method of claim 1, wherein said communicating is provided by a communications device on said payment device and said communications device is an RF-based communications device.

4. The method of claim 1, wherein said communicating is provided by a communications device on said payment device and said communications device provides an electromagnetic signal.

5. The method of claim 1, wherein said communicating is provided by a communications device on said payment device and said communications device comprises a dynamic magnetic stripe communications device.

6. The method of claim 1, wherein said payment card is a mobile telephonic device.

7. The method of claim 1, wherein said user profile is stored on a remote server.

8. The method of claim 1, further comprising providing at least a portion of said user profile as at least a portion of a webpage.

9. The method of claim 1, further comprising updating said user profile with a total amount of said purchase transaction.

10. The method of claim 1, wherein said authorization is provided by a remote server.

11. The method of claim 1, wherein said updating is provided by a remote server.

12. The method of claim 1, wherein said payment device comprises a battery, a processor, and a plurality of buttons.

13. The method of claim 1, wherein said payment device comprises a battery, a processor, a plurality of buttons, an RFID antenna, and a display.

14. The method of claim 1, wherein said payment device comprises a battery, a processor, a plurality of buttons, and a dynamic magnetic stripe communications device.

15. The method of claim 1, wherein said payment device comprises a plurality of displays.

16. The method of claim 1, further comprising:
   providing a third-party service based on said selection of a check-in option.

* * * * *